US012691466B2

(12) United States Patent
Liu et al.

(10) Patent No.: US 12,691,466 B2
(45) Date of Patent: Jul. 28, 2026

(54) COATING PRODUCTION DEVICE FOR OPTICAL FILM

(71) Applicant: Nanjing Bready Advanced Materials Technology Co., Ltd., Nanjing (CN)

(72) Inventors: Yong Liu, Nanjing (CN); Hongliang Zhu, Nanjing (CN)

(73) Assignee: Nanjing Bready Advanced Materials Technology Co., Ltd., Nanjing (CN)

( * ) Notice: Subject to any disclaimer, the term of this patent is extended or adjusted under 35 U.S.C. 154(b) by 638 days.

(21) Appl. No.: 18/188,264

(22) Filed: Mar. 22, 2023

(65) Prior Publication Data

US 2023/0302486 A1 Sep. 28, 2023

(30) Foreign Application Priority Data

Mar. 22, 2022 (CN) ......................... 202210284718.2

(51) Int. Cl.
*B05C 11/00* (2006.01)
*B05C 9/14* (2006.01)
*B05C 11/10* (2006.01)

(52) U.S. Cl.
CPC ............ *B05C 11/1005* (2013.01); *B05C 9/14* (2013.01)

(58) Field of Classification Search
USPC .................................................... 118/712, 58
See application file for complete search history.

(56) References Cited

U.S. PATENT DOCUMENTS

2006/0066846 A1 3/2006 Chen
2010/0033735 A1* 2/2010 Sakai ................ G01B 11/0633 118/712

FOREIGN PATENT DOCUMENTS

| | | | | |
|---|---|---|---|---|
| CN | 104808586 | A | | 7/2015 |
| CN | 106053348 | A | | 10/2016 |
| CN | 205910115 | U | * | 1/2017 |
| CN | 206618705 | U | | 11/2017 |
| CN | 110695901 | A | | 1/2020 |
| CN | 113426647 | A | | 9/2021 |
| JP | H04131749 | A | | 5/1992 |
| JP | H09318330 | A | | 12/1997 |
| JP | 2010203813 | A | | 9/2010 |
| JP | 2017203693 | A | | 11/2017 |
| JP | 2020079753 | A | | 5/2020 |

OTHER PUBLICATIONS

English Translation CN-25910115 (Year: 2017).*

* cited by examiner

*Primary Examiner* — Yewebdar T Tadesse
(74) *Attorney, Agent, or Firm* — Syncoda LLC; Feng Ma

(57) ABSTRACT

A coating production device for an optical film includes a base plate. Supporting rods are fixed on a top at both front and rear sides of the base plate. A transverse plate is jointly fixed on outer walls at opposite surfaces of the two supporting rods by a fixing rod. A Y-shaped tube is mounted on a bottom of the transverse plate. The Y-shaped tube includes a vertical tube and branch tubes communicating with outer walls at two sides of the vertical tube. Tops of the two branch tubes are respectively mounted on the bottom at two sides of the transverse plate by a mounting rod.

8 Claims, 7 Drawing Sheets

COATING PRODUCTION DEVICE FOR OPTICAL FILM

CROSS-REFERENCE TO RELATED APPLICATION

This application claims priority to Chinese Application No. 202210284718.2 filed on Mar. 22, 2022, the disclosure of which is hereby incorporated by reference in its entirety.

BACKGROUND

Optical thin films are classified into reflection films, anti-reflection films, filter films, optical protective films, polarizing films, beam-splitting films and phase films in terms of applications, among which the first four types are commonly used at present. A coating machine is mainly used for a surface coating process of the thin films, paper, etc. Specifically, by the machine, a rolled-up substrate is coated with a layer of special adhesive, paint or ink, etc., dried and then wound up.

At present, when an optical film is produced, the optical film needs to be first coated with a layer of adhesive by the coating machine, dried by a drying device, and then wound up.

However, for the existing coating devices, the adhesive may be coated unevenly on the optical film due to such factors as aging and blockage of an adhesive brush head or uneven adhesive melting. The adhesive layer is hardly recognized by naked eyes. In case of directly drying and winding up, the quality of the final finished optical film will be affected. Therefore, it is essential to detect the adhesive-coated optical film.

SUMMARY

The disclosure relates to the technical field of optical films, and specifically to a coating production device for an optical film.

The present disclosure provides the following technical solutions. A coating production device for an optical film includes a base plate. Supporting rods are fixed on a top at both front and rear sides of the base plate. A transverse plate is jointly fixed on outer walls at opposite surfaces of two supporting rods by a fixing rod. A Y-shaped tube is mounted on a bottom of the transverse plate. The Y-shaped tube includes a vertical tube and branch tubes communicating with outer walls at two sides of the vertical tube. Tops of two branch tubes are respectively mounted on the bottom at two sides of the transverse plate by a mounting rod. A light-emitting device capable of moving up and down is provided in the vertical tube.

An image receiver is mounted on a top of the base plate below the light-emitting device. The coating production device further includes an optical film having a surface coated with an adhesive. The optical film having a surface coated with an adhesive passes between the image receiver and the vertical tube, and the image receiver receives a light image transmitted through the optical film.

Figure 1:
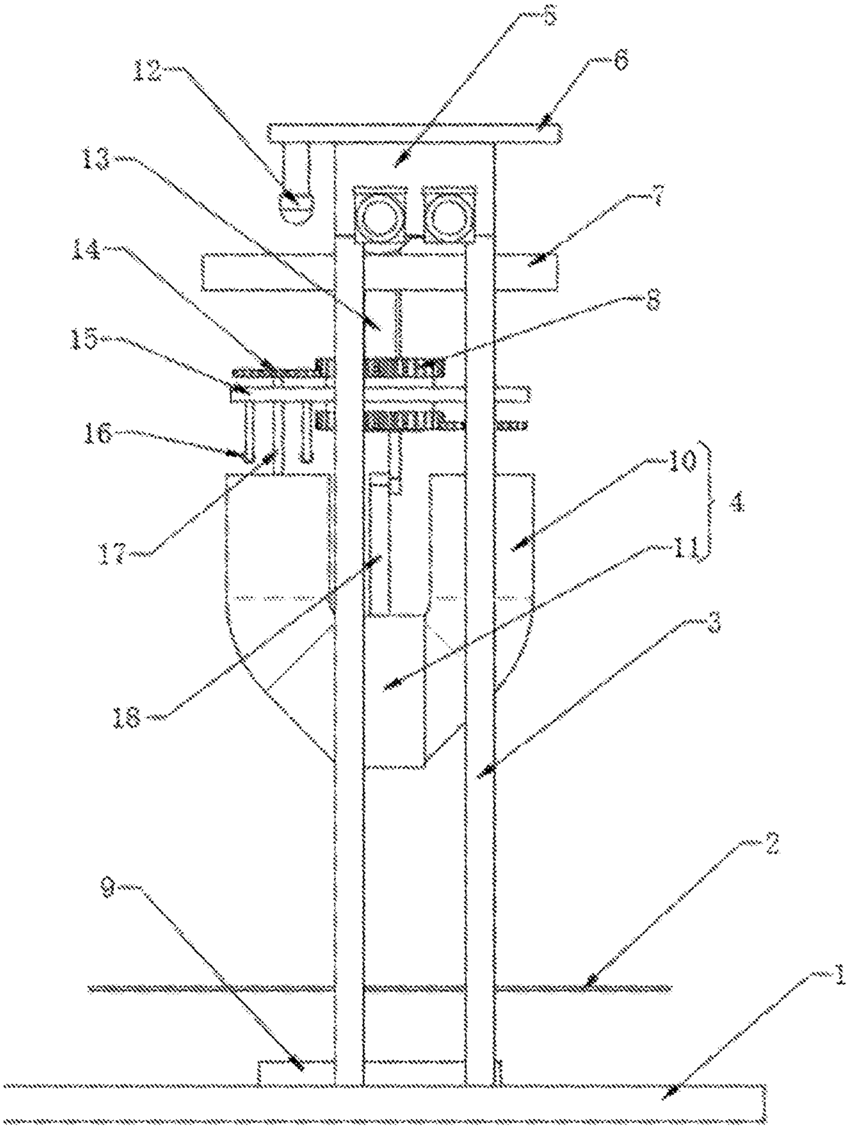
FIG. 1 is a front schematic structural view of the present disclosure.
Figure 2:
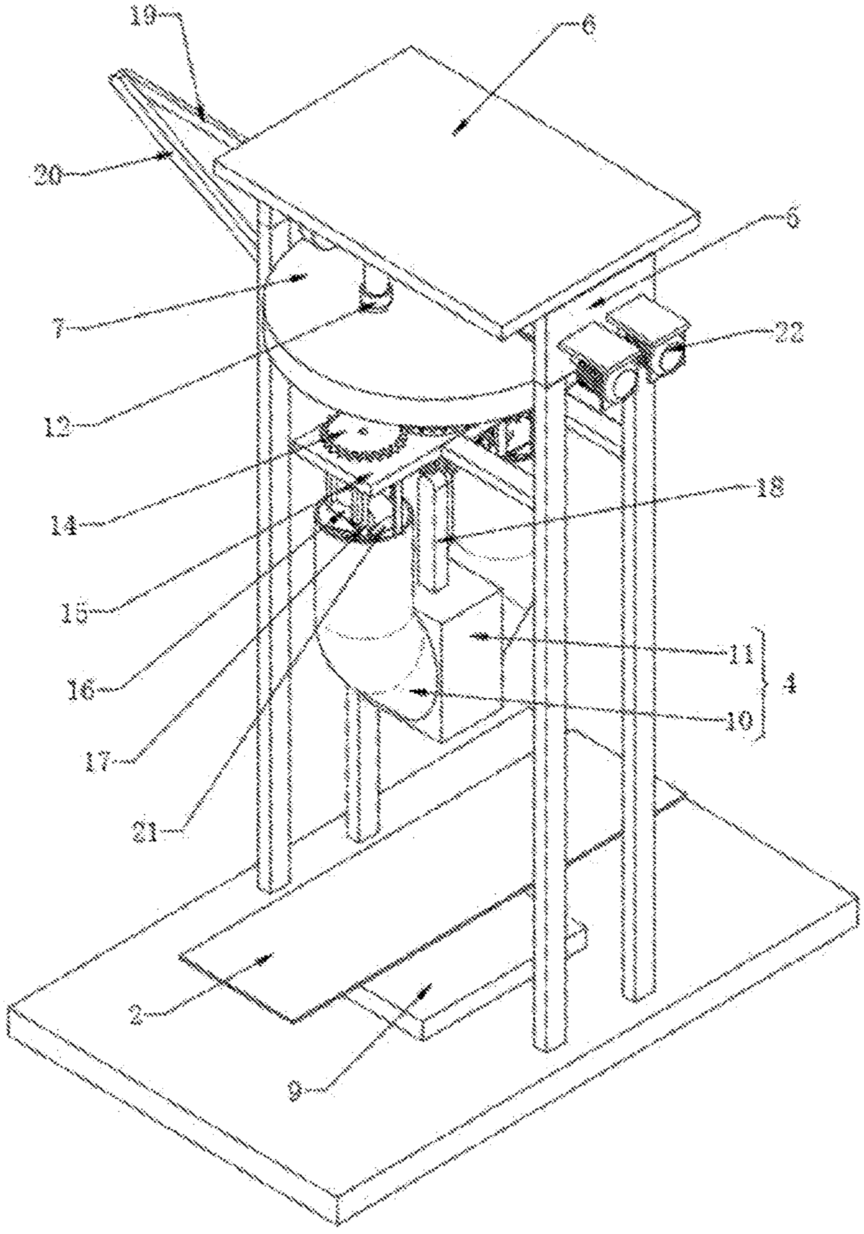
FIG. 2 is a perspective schematic structural view of the present disclosure.

Reference numerals: 1. base plate, 2. optical film, 3. supporting rod, 4. Y-shaped tube, 5. mounting plate, 6. top plate, 7. friction disk, 8. driven ring, 9. image receiver, 10. branch tube, 11. vertical tube, 12. speed sensor, 13. rotary shaft, 14. gear, 15. transverse plate, 16. electric heater, 17. rotary rod, 18. vertical rod, 19. transverse rod, 20. connecting rod, 21. fan blade, 22. first motor, 23. contact bar, 24. friction wheel, 25. trigger rod, 26. moving plate, 27. locking pawl, 28. sliding rod, 29. threaded rod, 30. light-emitting device, 31. inner wheel, 32. groove, 33. ratchet groove, 34. first threaded rod, 35. guide rod, 36. lifting plate, 37. second motor, and 38. threaded member.

DETAILED DESCRIPTION

The technical solutions of the embodiments of the present disclosure are clearly and completely described below with reference to the accompanying drawings. It is apparent that the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Embodiment 1

Referring to FIG. 1 to FIG. 7, the present disclosure provides a technical solution as follows. A coating production device for an optical film includes a base plate 1. Supporting rods 3 are fixed on a top at both front and rear sides of the base plate 1. A transverse plate 15 is jointly fixed on outer walls at opposite surfaces of the two supporting rods 3 by a fixing rod. A Y-shaped tube 4 is mounted on a bottom of the transverse plate 15. The Y-shaped tube 4 includes a vertical tube 11 and branch tubes 10 communicating with outer walls at two sides of the vertical tube 11. Tops of the two branch tubes 10 are respectively mounted on the bottom at two sides of the transverse plate 15 by a mounting rod. A light-emitting device 30 capable of moving up and down is provided in the vertical tube 11.

An image receiver 9 is mounted on a top of the base plate 1 below the light-emitting device 30. The coating production device further includes an optical film 2 having a surface coated with an adhesive. The optical film 2 having a surface coated with an adhesive passes between the image receiver 9 and the vertical tube 11, and the image receiver 9 receives a light image transmitted through the optical film 2.

The coating production device may be mounted between a device for coating an adhesive on a surface of the optical film 2 and a winding device, or may also be used independently. When the optical film 2 coated with the adhesive passes between the image receiver 9 and the vertical tube 11, the light-emitting device 30 emits light to irradiate the optical film 2. A light image transmitted through the optical film 2 is then received by the image receiver 9. Thus, by the received clear image, a flaw on the surface of the optical film 2 is detected. Meanwhile, the light-emitting device 30 is driven by an external assembly to move downward. In this case, the light-emitting device 30 is closer to the optical film 2, and the light image transmitted through the optical film 2 is clearer. Moreover, if the optical film 2 has the flaw or an adhesive layer is coated unevenly on the surface of the optical film, a black dot will appear on the image received by the image receiver 9. Therefore, the effect that the flaw on the optical film 2 or the coating evenness of the adhesive layer is detected is achieved. Furthermore, while the light-emitting device 30 gets close to the optical film 2, the light image transmitted through the optical film 2 has a dynamic change from dark to turn bright gradually, which can make the black dot formed on the image have a dynamic change to become more obvious. Compared with the static photographing for detection, the present disclosure can further improve the detection accuracy.

Embodiment 2

Further, the coating production device further includes a drying assembly. The drying assembly includes two rotary rods 17. Holes are provided in an outer wall of the transverse plate 15 above both the two branch tubes 10. The two rotary rods 17 are rotatably mounted respectively in the two holes. Bottoms of the two rotary rods 17 respectively stretch into the two branch tubes 10, and fan blades 21 are fixed at the bottoms of the two rotary rods 17. An electric heater 16 is mounted on the bottom of the transverse plate 15 close to one of the rotary rods 17. The coating production device further includes a transmission assembly for driving the two rotary rods 17 to rotate alternately. The electric heater 16 only works for heating responsive to rotation of the rotary rod 17 close to the electric heater 16.

On the basis of Embodiment 1, while the light-emitting device 30 moves downward, the two rotary rods 17 is driven to rotate alternately by the transmission assembly. The rotary rod 17 close to the electric heater 16 rotates first, and the other rotary rod 17 remains stationary. In this case, the rotating rotary rod 17 drives the fan blade 21 at its bottom to rotate, and to blow air to the branch tube 10. Moreover, with the heating of the electric heater 16, the fan blade blows hot air out. The hot air then is blown out downward through the bottom of the vertical tube 11 to dry the adhesive layer on the surface of the optical film 2. Hence, the effect that the adhesive layer is dried while being detected is achieved. As the adhesive layer is dried, moisture in the adhesive layer is gradually lost, and thus the image of light through the adhesive layer and the optical film 2 is clearer. Also, as the adhesive layer is dried, the black dot formed in the light image can become more obvious if a portion of the adhesive layer is coated unevenly. Furthermore, with the drying of the hot air, the optical film 2 shows slight vibration, so that the formed light image also has a change to some extent. When a black dot appears on the optical film, the black dot forms a black line or a black cluster with the vibration of the optical film 2, and thus becomes more obvious. As a result, the accuracy of its detection result is further improved.

As the light-emitting device 30 continues to move downward, the transmission assembly drives the other rotary rod 17 to rotate, and the electric heater 16 is turned off. In this case, cold air is blown from under the vertical tube 11, which can cool down the dried adhesive layer and optical film 2. Since the heated optical film 2 may become soft to some extent so that the side of the optical film not coated with the adhesive may also become sticky, cooling down the optical film upon drying can facilitate subsequent winding of the optical film 2, and prevents the damage of the optical film due to a pulling force. In case of a sheet-like optical film 2, mutual adhesion for the side of the optical film 2 not coated with the adhesive can further be prevented.

Embodiment 3

Further, the transmission assembly includes a rotary shaft 13 capable of rotating forwardly and reversely. A hole is provided in a top at a middle of the transverse plate 15. The rotary shaft 13 is rotatably mounted in the hole. Inner wheels 31 are fixed on an outer wall of the rotary shaft 13 at both upper and lower sides of the transverse plate 15. Driven rings 8 sleeved respectively on outer races of the two inner wheels 31 are rotatably mounted on the outer wall at both the upper and lower sides of the transverse plate 15. Teeth are provided on outer walls having arc surfaces of both the two driven rings 8. Gears 14 are fixed on outer walls of both the two rotary rods 17. The two gears 14 are respectively engaged with the teeth of the two driven rings 8. Ratchet grooves 33 are provided in inner races of both the two driven rings 8. Orientations of the two ratchet grooves 33 are opposite to each other. Grooves 32 are provided in outer walls having arc surfaces of both the two inner wheels 31. Locking pawls 27 are rotatably mounted in both the two grooves 32 through a pin shaft. Orientations of the two locking pawls 27 are opposite to each other. Torsional springs capable of allowing the locking pawls 27 to protrude out of the grooves 32 are mounted between the locking pawls 27 and the grooves 32.

Figure 5:
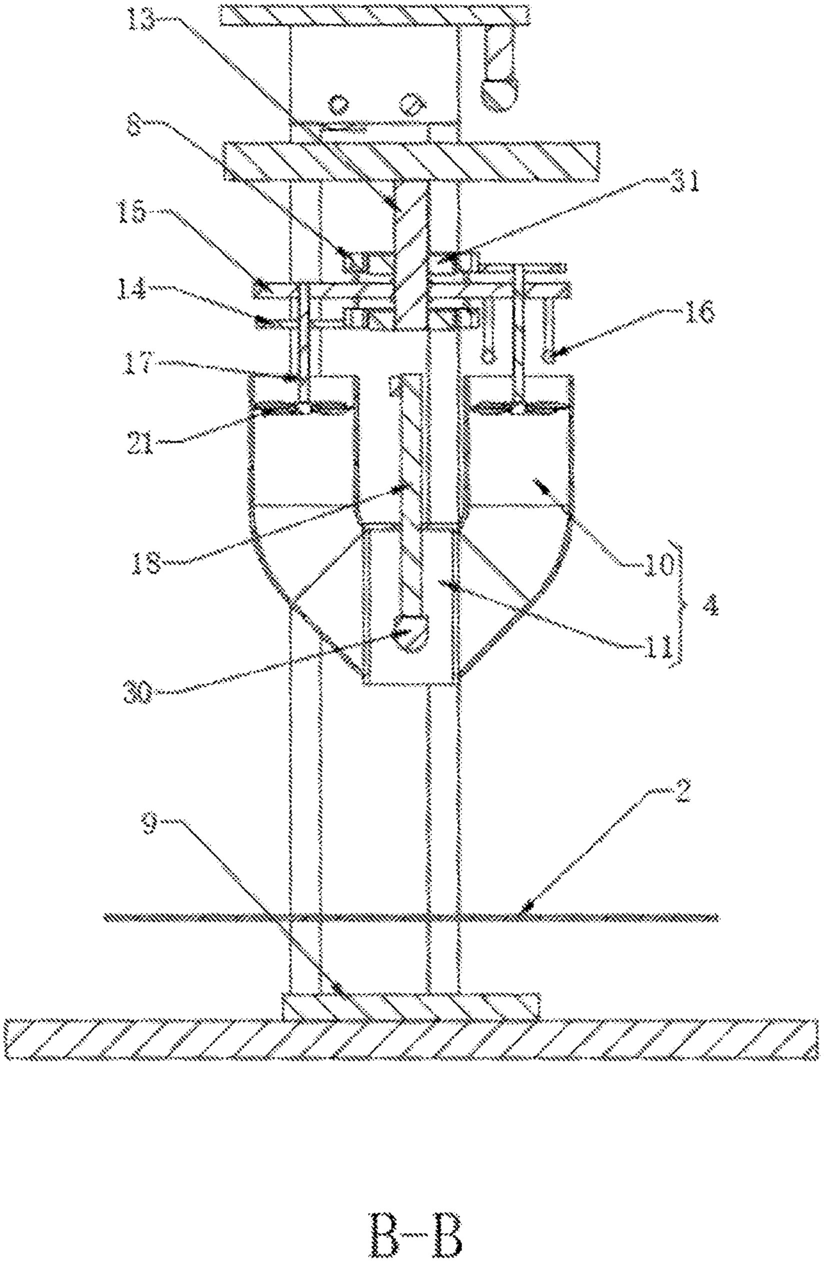
FIG. 5 is a sectional schematic structural view along B-B in FIG. 3 of the present disclosure.
Figure 6:
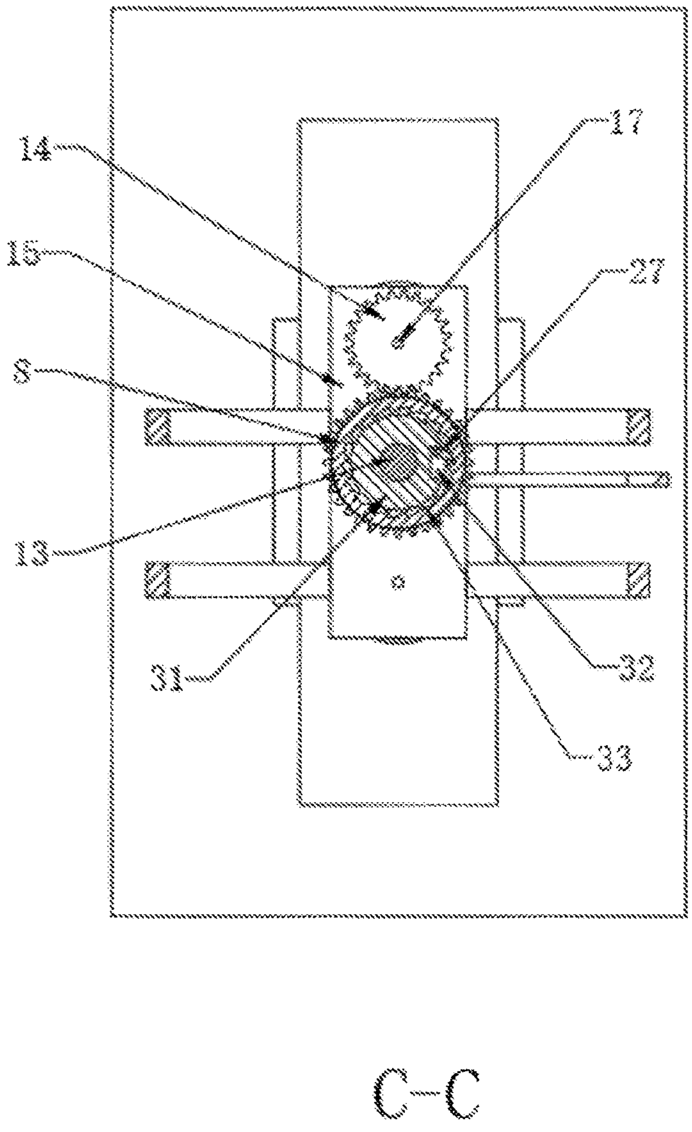
FIG. 6 is a sectional schematic structural view along C-C in FIG. 3 of the present disclosure.

There is provided an implementation mode of the transmission assembly. Referring to FIG. 5 and FIG. 6, when the rotary shaft 13 is driven to rotate by an external structural assembly, the rotary shaft 13 drives the two inner wheels 31 to rotate together. Since the orientations of the locking pawls 27 on the two driven rings 8 are opposite to each other, one of the driven rings 8 drives the corresponding driven ring 8 by the locking pawl 27 to rotate, and then drives the gear 14 with which it is engaged to rotate, thereby driving the rotary rod 17 to rotate. The locking pawl 27 on the other driven ring 8 rotates along the orientation of the corresponding ratchet groove 33, and does not drive the ratchet groove 33 to rotate. Hence, when forwardly rotating, the rotary shaft 13 drives one of the rotary rods 17 to rotate. On the contrary, when reversely rotating, the rotary shaft 13 drives the other one of the rotating rods 17 to rotate. Therefore, the effect that the two rotary rods 17 is rotated alternately is achieved.

Embodiment 4

Further, a friction disk 7 is fixed on a top of the rotary shaft 13. Mounting plates 5 are fixed on tops of both the two supporting rods 3. A rotatable threaded rod 29 and a rotatable sliding rod 28 are jointly mounted on opposite surfaces of the two mounting plates 5. A friction wheel 24 is slidably mounted on an outer wall of the sliding rod 28 through a flat key. The friction wheel 24 comes in frictional contact with the friction disk 7. A moving plate 26 is jointly mounted between the sliding rod 28 and the threaded rod 29. The threaded rod 29 penetrates through the moving plate 26 and is in threaded connection with where the moving plate 26 is penetrated through. An end of the moving plate 26 away from the threaded rod 29 is rotatably connected to an outer wall of the friction wheel 24.

Figure 4:
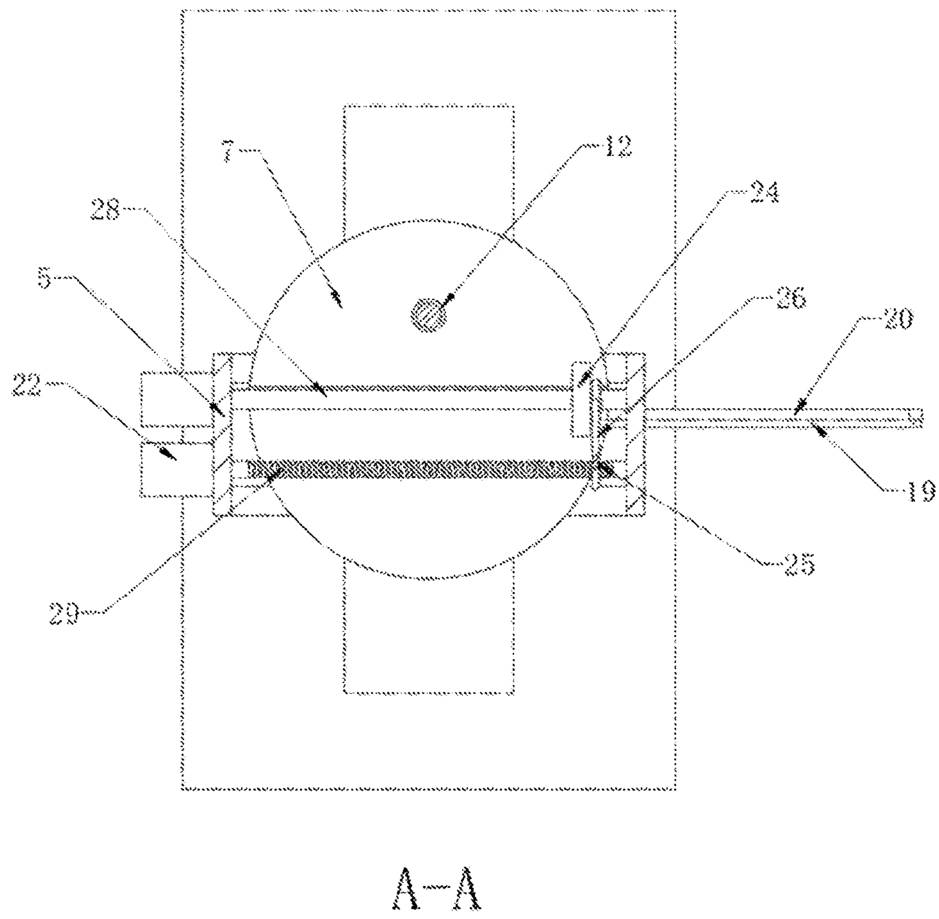
FIG. 4 is a sectional schematic structural view along A-A in FIG. 3 of the present disclosure.

By an external structure, the threaded rod 29 and the sliding rod 28 are driven to rotate. Referring to FIG. 4, since the sliding rod 28 limits the moving plate 26, the rotating threaded rod 29 drives the moving plate 26 to move. The rotating sliding rod 28 drives the friction wheel 24 through the flat key to rotate. The friction wheel 24 rotates oppositely to the moving plate 26. The rotating friction wheel 24 drives the friction disk 7 to rotate, thereby driving the rotary shaft 13 on its bottom to rotate. Hence, while rotating, the friction wheel 24 moves with the movement of the moving plate 26. The friction wheel 24 moves gradually from the edge of the friction disk 7 to a center of the friction disk and then moves through the center to the edge. In this process, the rotational speed of the friction disk 7 gradually becomes larger from small, shows a short stop when the friction wheel 24 is located in the center, and then gradually becomes larger from small again. After the friction wheel 24 crosses the center of the friction disk 7, the friction disk 7 is driven to rotate reversely.

As can be seen from the above, by transmission between the structures, the fan blade 21 close to the electric heater 16 is rotated first. With the heating of the electric heater 16, the fan blade blows hot air out. Since the air force is from small to large, the optical film 2 and the adhesive layer thereon are preheated in an early stage and then heated gradually. This prevents a phenomenon that the adhesive layer cannot be leveled timely for an excessively quick volatilization rate of the related solvents therein in direct high-temperature drying to cause pinhole bubbles in the adhesive layer. In this way, the adhesive layer not coated evenly can be leveled timely. The adhesive layer may also level automatically and be even in the drying process even if it is not coated evenly previously, thereby improving the curing effect of the adhesive layer.

When the friction wheel 24 crosses the center of the friction disk 7, the friction disk 7 is driven to rotate reversely. Also, the electric heater 16 is turned off. The other fan blade 21 then rotates to blow cold air out to cool down the optical film 2 and the adhesive layer. The rotational speed of the fan blade 21 for cooling down is quick since the initial temperature of the optical film 2 is relatively high, and then slows down gradually as the friction wheel 24 moves close to the edge of the friction disk 7.

Embodiment 5

Further, a top plate 6 is jointly fixed on tops of the two mounting plates 5. A contact bar 23 is mounted on a bottom of the top plate 6 above the moving plate 26, and has an end point located at a center of the friction disk 7. A trigger rod 25 is fixed on a top of the moving plate 26. A speed sensor 12 capable of sensing a rotational speed of the friction disk 7 is mounted on the bottom of the top plate 6. A heating power of the electric heater 16 changes with a change in the rotational speed of the friction disk 7 detected by the speed sensor 12. The speed sensor 12 is turned on responsive to contact between the trigger rod 25 and the contact bar 23. At an initial state, the friction wheel 24 is located at a position close to an edge of the friction disk 7, and the trigger rod 25 is located at a starting point of the contact bar 23.

Figure 3:
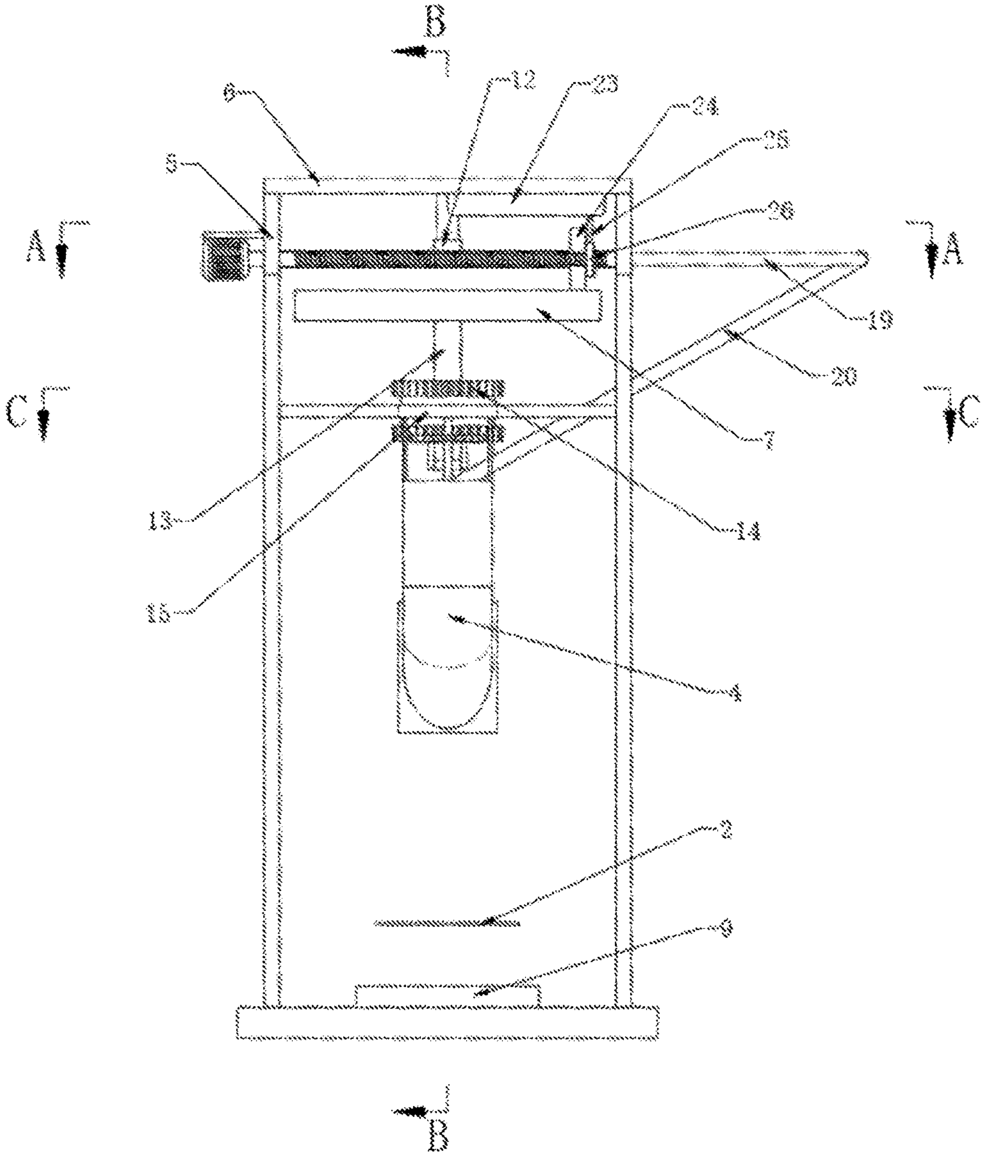
FIG. 3 is a right schematic structural view of the present disclosure.

As can be seen from the above, when the moving plate 26 starts moving from the initial state, referring to FIG. 3 and FIG. 4, the rotary rod 17 and the fan blade 21 close to the electric heater 16 rotate. Also, the trigger rod 25 comes in contact with the contact bar 23. Thus, the speed sensor 12 is controlled to turn on through an electrical signal to sense the rotational speed of the friction disk 7. Meanwhile, the electric heater 16 is turned on for heating. As the friction wheel 24 moves gradually from the edge of the friction disk 7 to the center, the rotational speed of the friction disk 7 gradually becomes larger from small. Under the control of the speed sensor 12, the heating power of the electric heater 16 also gradually becomes higher. In cooperation with the rotational speed of the fan blade 21, the hot air is increased gradually to preheat the adhesive layer and the optical film 2.

When the friction wheel 24 crosses the center of the friction disk 7 with the movement of the moving plate 26, the trigger rod 25 is separated from the contact bar 23, so that the electric heater 16 is turned off and stops heating while the friction disk 7 rotates reversely.

Embodiment 6

Further, a transverse rod 19 arranged horizontally is fixed on an outer wall of the moving plate 26. An end of the transverse rod 19 penetrates through an outer wall of one of the mounting plates 5, and is slidably connected with where the mounting plate 5 is penetrated through. A connecting rod 20 is rotatably mounted at the end of the transverse rod 19 through the mounting plate 5. A hole is provided in a top of the vertical tube 11. A vertical rod 18 is vertically and slidably mounted on an inner wall of the hole. The light-emitting device 30 is mounted on a bottom of the vertical rod 18. A bottom of the connecting rod 20 is rotatably connected with a top of the vertical rod 18.

There is provided an implementation mode in which the light-emitting device 30 can be moved up and down. Referring to FIG. 3, when the moving plate 26 starts moving from the initial state, the transverse rod 19 is driven to move. Under the action of the connecting rod 20, the vertical rod 18 is driven to move downward, so that the light-emitting device 30 gets close to the image receiver 9. On the contrary, when the moving plate 26 returns, the vertical rod 18 is driven by the connecting rod 20 to move upward, so that the light-emitting device 30 gets away from the image receiver 9.

Embodiment 7

Further, guide rods 35 are fixed on a top of the vertical tube 11. A lifting plate 36 is slidably mounted on outer walls of the guide rods 35. A second motor 37 is mounted on a top of the lifting plate 36. An output shaft on a bottom of the second motor 37 passes through the lifting plate 36, and a first threaded rod 34 is fixed on the output shaft. A hole for the passage of the first threaded rod 34 is provided in the top of the vertical pipe 11. A threaded member 38 is fixed on the top of the vertical tube 11 at the hole. The first threaded rod 34 passes through the threaded member 38, and is in threaded connection with an internal thread of the threaded member 38. The light-emitting device 30 is mounted on a bottom of the first threaded rod 34 penetrating into the vertical tube 11.

Figure 7:
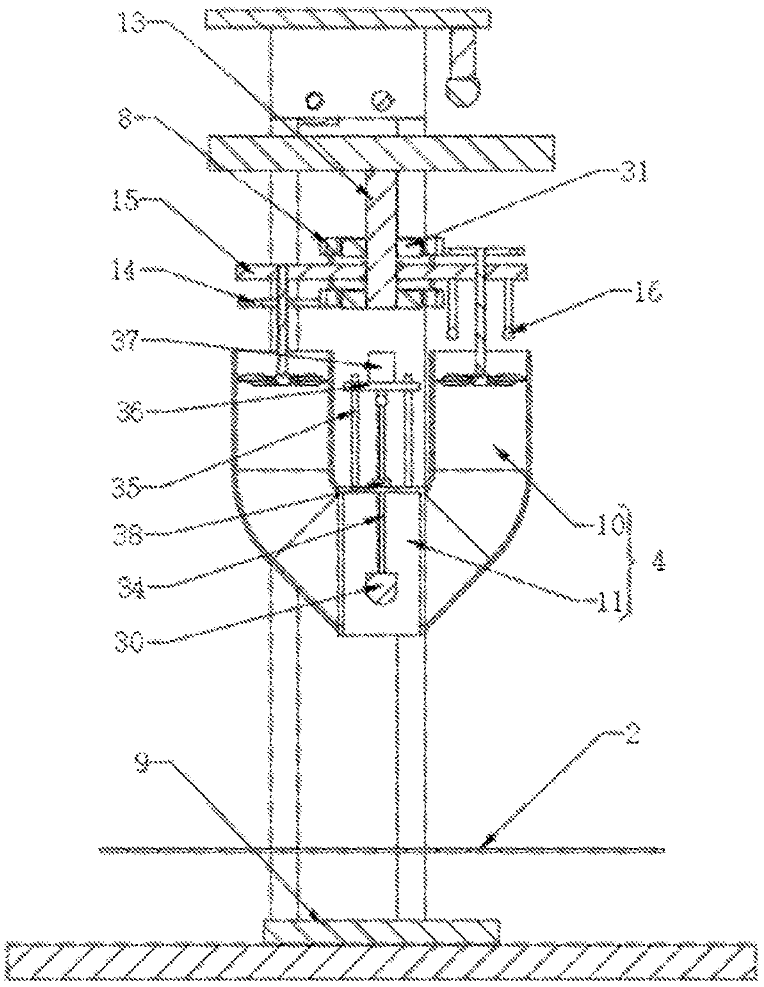
FIG. 7 is a sectional schematic structural view along A-A of Embodiment 8 of the present disclosure.

There is provided another implementation mode in which the light-emitting device 30 can be moved up and down. Referring to FIG. 7, when the moving plate 26 starts moving from the initial state, the output shaft of the second motor 37 rotates forwardly, and drives the first threaded rod 34 to rotate. Since the first threaded rod 34 is in threaded fit with the threaded member 38, and is fixedly connected with the threaded member 38, the first threaded rod 34 moves downward, and drives the light-emitting device 30 and the lifting plate 36 to move downward together. When the moving plate 26 returns, the output shaft of the second motor 37 rotates reversely, so that the first threaded rod 34 moves upward, and drives the lifting plate 36 and the light-emitting device 30 to move upward. By the switching of the forward and reverse rotation of the second motor 37, the implementation mode is better controlled and more automatic than the implementation mode provided in Embodiment 6.

Embodiment 8

Further, two first motors 22 for respectively driving the sliding rod 28 and the threaded rod 29 to rotate are mounted on an outer wall of one of the mounting plates 5.

While the sliding rod 28 and the threaded rod 29 are driven to rotate by respectively controlling the two first motors 22, the rotational speeds of the sliding rod and the threaded rod can also be controlled respectively so as to be adjusted according to an actual condition.

Standard parts in the embodiments can be directly available from market, while non-standard structural parts described according to the specification and accompanying drawings may also be machined undoubtedly according to the existing technical knowledge. Moreover, connecting manners between various parts are mature conventional means in some implementations. All machines, parts and devices are of the conventional type in some implementations and are not specifically described herein.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their equivalents.

What is claimed is:

1. A coating production device for an optical film, comprising a base plate, wherein supporting rods are fixed on a top surface at both front and rear sides of the base plate; a transverse plate is jointly fixed on outer walls at opposite surfaces of two supporting rods by a fixing rod; a Y-shaped tube is mounted on a bottom surface of the transverse plate; the Y-shaped tube comprises a vertical tube and two branch tubes communicating with outer walls at two sides of the vertical tube; top ends of the two branch tubes are respectively mounted on the bottom surface at two sides of the transverse plate by a mounting rod; and a light-emitting device capable of moving up and down is provided in the vertical tube; and an image receiver is mounted on a top surface of the base plate below the light-emitting device; the coating production device further comprises the optical film having a surface coated with an adhesive; wherein the optical film having a surface coated with an adhesive passes between the image receiver and the vertical tube, and the image receiver receives a light image transmitted through the optical film.

2. The coating production device for the optical film of claim 1, further comprising a drying assembly, wherein the drying assembly comprises two rotary rods; two holes are provided in an outer wall of the transverse plate above both the two branch tubes; the two rotary rods are rotatably mounted respectively in the two holes; bottom ends of the two rotary rods respectively stretch into the two branch tubes, and fan blades are fixed at the bottom ends of the two rotary rods; an electric heater is mounted on the bottom surface of the transverse plate close to one of the two rotary rods; the coating production device further comprises a transmission assembly for driving the two rotary rods to rotate alternately; and the electric heater only works for heating responsive to rotation of one of the two rotary rods close to the electric heater.

3. The coating production device for the optical film of claim 2, wherein the transmission assembly comprises a rotary shaft capable of rotating forwardly and reversely; a hole, in which the rotary shaft is rotatably mounted, is provided in a top surface at a middle of the transverse plate; two inner wheels are fixed on an outer wall of the rotary shaft at both upper and lower sides of the transverse plate; two driven rings sleeved respectively on outer races of the two inner wheels are rotatably mounted on the outer wall at both the upper and lower sides of the transverse plate; teeth are provided on outer walls having arc surfaces of the two driven rings; two gears are fixed on outer walls of both the two rotary rods; the two gears are respectively engaged with the teeth of the two driven rings; two ratchet grooves are provided in inner races of both the two driven rings; orientations of the two ratchet grooves are opposite to each other; two grooves are provided in outer walls having arc surfaces of both the two inner wheels; two locking pawls are rotatably mounted in both the two grooves through a pin shaft; orientations of the two locking pawls are opposite to each other; and torsional springs capable of allowing the two locking pawls to protrude out of the two grooves are mounted between the two locking pawls and the two grooves.

4. The coating production device for the optical film of claim 3, wherein a friction disk is fixed on a top surface of the rotary shaft; two mounting plates are fixed on top surfaces of both the two supporting rods; a rotatable threaded rod and a rotatable sliding rod are jointly mounted on opposite surfaces of the two mounting plates; a friction wheel is slidably mounted on an outer wall of the rotatable sliding rod through a flat key; the friction wheel comes in frictional contact with the friction disk; a moving plate is jointly mounted between the rotatable sliding rod and the rotatable threaded rod; the rotatable threaded rod penetrates through the moving plate and is in threaded connection with where the moving plate is penetrated through; and an end of the moving plate away from the rotatable threaded rod is rotatably connected with an outer wall of the friction wheel.

5. The coating production device for the optical film of claim 4, wherein a top plate is jointly fixed on top surfaces of the two mounting plates; a contact bar is mounted on a bottom surface of the top plate above the moving plate, and has an end point located at a center of the friction disk; a trigger rod is fixed on a top surface of the moving plate; a speed sensor capable of sensing a rotational speed of the friction disk is mounted on the bottom surface of the top plate; a heating power of the electric heater changes with a change in the rotational speed of the friction disk detected by the speed sensor; the speed sensor is turned on responsive to contact between the trigger rod and the contact bar; and at an initial state, the friction wheel is located at a position close to an edge of the friction disk, and the trigger rod is located at a starting point of the contact bar.

6. The coating production device for the optical film of claim 4, wherein a transverse rod arranged horizontally is fixed on an outer wall of the moving plate; an end of the transverse rod penetrates through an outer wall of one of the two mounting plates, and is slidably connected with where one of the two mounting plates is penetrated through; a connecting rod is rotatably mounted at the end of the transverse rod through one of the two mounting plates; a hole, on an inner wall of which a vertical rod is vertically and slidably mounted, is provided in a top surface of the vertical tube; the light-emitting device is mounted on a bottom end of the vertical rod; and a bottom end of the connecting rod is rotatably connected with a top end of the vertical rod.

7. The coating production device for the optical film of claim 4, wherein guide rods are fixed on a top surface of the vertical tube; a lifting plate is slidably mounted on outer walls of the guide rods; a second motor is mounted on a top surface of the lifting plate; an output shaft on a bottom surface of the second motor passes through the lifting plate, and a first threaded rod is fixed on the output shaft; a hole for passage of the first threaded rod, at which a threaded member is fixed on the top surface of the vertical tube, is provided in the top surface of the vertical tube; the first threaded rod passes through the threaded member, and is in threaded connection with an internal thread of the threaded member; and the light-emitting device is mounted on a bottom end of the first threaded rod penetrating into the vertical tube.

8. The coating production device for the optical film of claim 4, wherein two first motors for respectively driving the rotatable sliding rod and the rotatable threaded rod to rotate are mounted on an outer wall of one of the two mounting plates.

* * * * *